United States Patent [19]

Heidenreich

[11] Patent Number: 5,228,543
[45] Date of Patent: Jul. 20, 1993

[54] SEALED WET DISC BRAKE FOR VEHICLES
[75] Inventor: David C. Heidenreich, Akron, Ohio
[73] Assignee: Power Transmission Technology, Inc., Sharon Center, Ohio
[21] Appl. No.: 829,308
[22] Filed: Feb. 3, 1992
[51] Int. Cl.⁵ ............................................. F16D 55/18
[52] U.S. Cl. .................................. 188/72.4; 188/71.5; 188/366; 188/264 E; 192/70.11; 92/146; 92/151
[58] Field of Search ............... 188/72.4, 72.5, 71.5, 188/264 E, 366, 367, 370, 71.4, 71.3; 192/70.11, 70.21, 85 R; 92/151, 146; 277/169, 168, 138, 146, 165, 117, 121, 102

[56] References Cited

U.S. PATENT DOCUMENTS

| | | | |
|---|---|---|---|
| 2,401,379 | 6/1946 | Smith | 277/117 |
| 2,683,504 | 7/1954 | Martin | 188/71.5 |
| 2,871,987 | 2/1959 | Du Bois | 188/71.5 X |
| 2,888,101 | 5/1959 | Bayles | 188/71.5 |
| 2,925,889 | 2/1960 | Albright | 188/71.5 X |
| 3,371,936 | 3/1968 | Beaudette | 277/117 |
| 4,474,268 | 10/1984 | Dayen | 188/71.5 |
| 4,953,876 | 9/1990 | Müller | 277/165 |

Primary Examiner—Douglas C. Butler
Attorney, Agent, or Firm—Renner, Kenner, Greive, Bobak, Taylor & Weber

[57] ABSTRACT

A sealed vehicle wet disc brake has a brake housing and a piston housing which are fixedly interconnected and which receive a rotor. The two housings and rotor define an annular cavity which is sealed by appropriate rotary seals and in which is maintained a friction stack. The piston housing has a plurality of uniformly spaced piston bores therein, such bores being interconnected by an annular groove which circumferentially intersects with a circumferential surface of the piston housing. A pressure source of fluid communicates with the annular groove and the piston received within the bores. The annular groove is sealed by means of an "O" ring engaged therein from the circumferential surface and retained by a retaining ring. The intersection of the annular groove with the circumferential surface is tapered to accommodate compressive retention of the "O" ring.

5 Claims, 1 Drawing Sheet

SEALED WET DISC BRAKE FOR VEHICLES

TECHNICAL FIELD

The invention herein resides in the art of vehicle braking systems and, more particularly, to disc brake systems. Specifically, the invention relates to a sealed multiple disc and multiple piston wet brake disc assembly.

BACKGROUND ART

Various types of vehicle braking systems are presently known. Most vehicles, particularly land vehicles, have drum or disc brakes in which the brake elements and friction surfaces are exposed to the atmosphere. Many land vehicles are subjected to excessive abrasive and corrosive material in the form of of liquid, dust, or the like. Particularly, off-highway vehicles such as those used at construction sites, in mines, quarries, and the like are subjected to environments which are much more detrimental to their braking system than highway vehicles. It has been found that the brakes of such vehicles rapidly wear and are often the subject of failure. To prevent such occurrences, there is a need in the art for a sealed brake for land vehicles intended for operation in such environments. To prolong the life of such a sealed brake and to reduce its operating temperature, it is most desirable that the same be a wet brake, filled with appropriate oil or other fluid.

It is also known in the art that brakes and clutches have generally similar structural and operational features. In such devices, and particularly those of the "disc" type, a single annular hydraulic or pneumatic piston may be employed for actuation of the unit. In such brakes and clutches, the piston is typically annular and is concentric with the clutch or brake assembly itself. However, annular pistons have limitations in size and often interfere with other brake or clutch elements. Accordingly, such devices are often made in such a manner as to employ multiple pistons, the same being uniformly radially and circumferentially spaced about the operational axis of the device. In such multiple piston devices, there is a need to have each piston communicate with the hydraulic or pneumatic pressure source. In the prior art, this has typically required an annular ring with two sealing elements or cross drilling from one piston cavity to the next, such an operation being both time consuming and difficult to perform.

There is presently a need in the art for a sealed multiple piston brake or clutch assembly in which all of the piston cavities are interconnected by a single oil passage and in which a single sealing element may be employed to seal that passage.

DISCLOSURE OF INVENTION

In light of the foregoing, it is a first aspect of the invention to provide a vehicle wet disc brake which is sealed from atmosphere to isolate the friction elements and operative structure from the environment.

Another aspect of the invention is the provision of a vehicle wet disc brake which is of the multiple piston type and in which a singular circular passage interconnects all of the piston cavities.

Another aspect of the invention is the provision of a vehicle wet disc brake which is sealed by a single sealing member.

Yet a further aspect of the invention is the provision of a vehicle wet disc brake which employs an "O" ring in radially sealing engagement with the piston housing.

Still another aspect of the invention is the provision of vehicle wet disc brake assembly which is of a sealed nature and which is reliable and durable in operation.

Another aspect of the invention is the provision of a vehicle wet disc brake assembly which is conductive to implementation with state of the art elements and techniques.

The foregoing and other aspects of the invention which will become apparent as the detailed description proceeds are achieved by the improvement in a power transmission device having a housing with a plurality of piston bores therein for controlling engagement and disengagement of friction members, such improvement comprising: an annular groove within said housing interconnecting said bores and communicating with the source of fluid pressure, said annular groove circumferentially intersecting with a circumferential surface of said housing and further comprising a ring seal within said annular groove and compressibly held therein by a retaining ring, said ring seal comprising an "O" ring and said annular groove tapering inwardly from said circumferential surface, said taper extending from a maximum width exceeding an undistorted cross sectional diameter of said "O" ring to a minimum width less than an undistorted cross sectional diameter of said "O" ring, said annular groove having an untapered portion of said minimum width inwardly of said taper.

DESCRIPTION OF DRAWING

For a complete understanding of the objects, techniques and structure of the invention reference should be made to the following detailed description and accompanying drawing wherein.

BEST MODE FOR CARRYING OUT THE INVENTION

The following description is presented with respect to a sealed wet disc brake assembly. However, it will be appreciated by those skilled in the art that the structure and techniques presented herein may be employed in a clutch assembly as well. Indeed, the concept of the invention may be provided in many devices of the power transmission type, where the device achieves a regulatable transfer of power from an input source to an output device.

Figure 1:
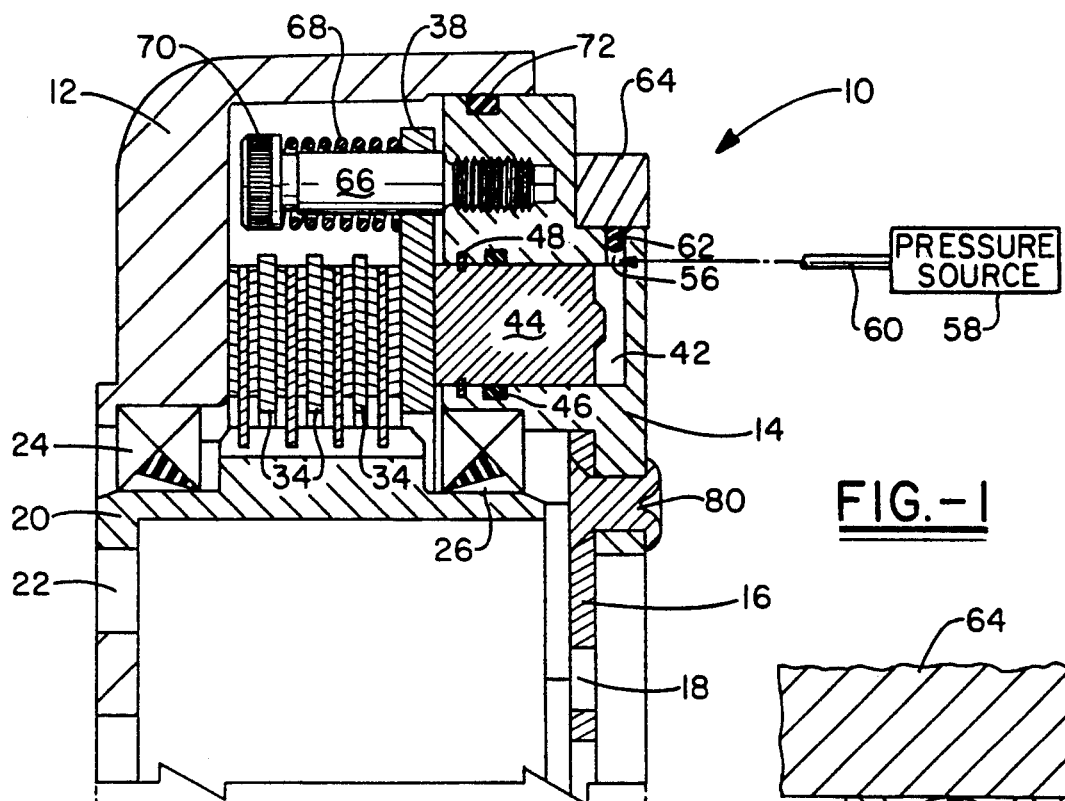
FIG. 1 is a cross sectional view of a sealed wet brake disc assembly according to the invention.

Referring now to the drawing and more particularly FIG. 1, it can be seen that a sealed brake assembly according to the invention is designated generally by the numeral 10. The illustration of FIG. 1 is shown in cross section, but it will be understood that the unit 10 is substantially annular or disc-like in construction. The brake assembly 10 includes an annular brake housing 12 and an annular piston housing 14, as shown. An axle adapter plate 16 is fixedly secured to the piston housing 14 as by rivets 80 or the like and is provided with a plurality of holes 18 therein to receive bolts or other appropriate fasteners for securing the plate 16 to the axle housing of a vehicle. In the preferred embodiment of the invention, the holes 18 are uniformly radially and circumferentially spaced with respect to a central axis of the plate 16, the same being coaxial with a central axis of the brake assembly 10 as whole. Of course, the nature of the plate 16 and the spacing of holes 18 will be tailored for the specific vehicle intended to receive the brake assembly 10.

Also included as a part of the brake assembly 10 is a rotor or hub 20 have holes 22 passing through a face plate thereof to receive wheel lug bolts or other appropriate fasteners for fixedly securing the rotor 20 to the vehicle wheel. Again, the holes 22 are preferably uniformly radially and circumferentially spaced with respect to the axis of the rotor 20 which is coaxial with the axis of the assembly 10. Appropriate annular rotary seals 24, 26 are provided in respective sealing interengagement between the rotor 20 and brake housing 12 and the rotor 20 and piston housing 14.

A plurality of torque pins 28 are provided to securedly interengage the brake housing 12 with the piston housing 14. A first end of each of the pins 28 is threadedly engaged with the piston housing 14 and a second threaded end of each pin 28 receives a nut 40 which engages the brake housing 12. A seal 78 is interposed between a shoulder on the pin 28 and the brake housing 12. The pin 28 is also sealed to the piston housing 14 by application of an appropriate thread sealant. Accordingly, the housings 12, 14 are fixedly maintained together and secured by means of the plate 16 to the vehicle axle. Rotatable within a cavity defined by the housings 12, 14 is the rotor 20 which is appropriately affixed to the vehicle wheel.

A friction disc stack is interconnected between the rotor 20 and the housings 12, 14 to provide the desired braking action. Friction rotors 30 are appropriately splined as at 32 to the rotor or hub 20. Alternatingly interleaved between the friction rotors 30 are separator plates 34 which are keyed to the torque pins 28 as at scallops or semicircular cut-outs provided in the circumferential edges of the separator plates 34 as shown at 36. Accordingly, the separator plates 34 are nonrotatable and effectively secured through the torque pins 28 to the housings 12, 14, while the friction rotors 30 are rotatable with the hub or rotor 20 as driven by the vehicle wheel. Braking operation is achieved by frictional interengagement between the friction rotors 30 and separator plates 34 as is generally understood by those skilled in the art. The splined attachment of the friction rotors 30 to the rotor 20 allows for axial movement of those elements, as does the keyed interconnection of the separator plates 34 to the torque pins 28. A brake-pressure plate 38, also keyed to the torque pins 28 as at 41 is also axially movable. Accordingly, application of pressure and resulting force upon the pressure plate 38 urges the stack of rotors 30 and separator plates 34 into frictional braking engagement.

A plurality of piston cavities or partial depth bores 42 are provided within the piston housing 14. In the preferred embodiment of the invention, the plurality of cavities 42 are equally spaced both radially and circumferentially within the piston housing 14 and with respect to the central axis thereof. The cavities 42 are provided to receive a sufficient compliment of pistons to assert a desired force upon the pressure plate 38 when actuated. For systems requiring maximum force, all piston cavities 42 might be populated, while brake assemblies requiring lesser force may have only selective cavities 42 so populated. As shown in FIG. 1 of the drawing, a piston assembly 44 is provided in one of the illustrated cavities 42. The piston assembly 44 is maintained within the cavity 42 by an appropriate keeper ring 48. An annular seal 46 is received within a groove within the housing 14 and within the cavity 42 and encompasses the piston assembly 44 to prevent the leakage of braking fluid or oil as will be discussed below.

Those piston cavities 42 which need not be populated with an active piston assembly 44 receive a plug 50 as shown in the drawing. The plug 50 is also provided with an annular seal 52 to seal the associated cavity 42. A keeper ring 54 is also provided in interengagement between the groove and housing 14 and the plug 50 to retain it in place. Accordingly, the plurality of cavities 42 are all populated and appropriately sealed, either by means of an active piston assembly 44 or by means of a plug.

An annular groove 56 extends radially inwardly from a circumferential external surface of the piston housing 14 to a depth which allows the groove 56 to interconnect in fluid passing communication with each of the bores 42. The annular groove 56 also communicates with a source of brake pressure 58, such as a master cylinder or the like, through an appropriate conduit or pressure line 60. An "O" ring 62 is received within the annular groove 56 and retained therein by means of a seal retaining ring 64 as shown. Those skilled in the art will readily understand that the "O" ring 62 is made of an appropriate elastomeric material which is impervious to adverse effects from the braking fluid or oil communicated from the pressure source 58, through the conduit 60, and into the annular groove 56. This fluid fills the groove 56 and the cavities 42 below the plugs 50 and piston assemblies 44 as sealed by respective seals 46, 52.

A plurality of shoulder bolts 66 are threadedly received by and seated upon the piston housing 14 and are uniformly spaced thereabout. The pressure plate 38 is provided with a plurality of similarly spaced openings for receiving the bolts 66, as shown. Each of the bolts 66 has a spring 68 operatively engaged between a head 70 of the bolt 66 and a surface of the pressure plate 38. This spring biases the pressure plate 38 against the actuating force asserted by the pistons 44 when brake oil is passed from the pressure source 58 through the conduit 60 and into the circumferential groove 56 for communication with each of the cavities 42. When such pressure is released, the springs 68 cause the pressure plate 38 to return until the pressure plate 38 bottoms against an inner surface of the piston housing 14. Those skilled in the art will understand that the travel of the pressure plate 38 from the brake-actuated state to the brake-released state is the built-in clearance between the friction rotors 30 and the separator plates 34. Accordingly, when the pressure provided by the pressure source 58 is insufficient to overcome the force of the springs 68, the springs 68 home the pressure plate 38 and allow substantial free wheeling of the vehicle wheel attached to the rotor or hub 20.

It is also contemplated that an appropriate wear compensation element may be desired for implementation with the wet disc brake 10. Such an element, as understood by those skilled in the art, assures that the built-in clearance of the brake disc stack remains substantially the same throughout the wear life of the brake by compensating for reduced thicknesses of the discs as they wear. Any of various types of brake wear adjusters may be employed for such purposes.

As further shown in FIG. 1, an annular seal 72 is provided in interengagement between the brake housing 12 and piston housing 14. Accordingly, the seals 24, 26, 72, 78 and the sealant applied to the threads of the pin 28 received by the piston housing 14 seal the pressure plate 38, friction rotors 30, and separator plates 34 from the environment and within an annular cavity defined by the housings 12, 14 and the rotor or hub 20, providing for a sealed brake mechanism. Additionally, the seals 52, 62 isolate the brake piston cavities 42 and the oil contained therein from both the environment and the internal envelope or cavity of the housings 12, 14 and rotor 20 which contain the friction elements. This sealed annular cavity is filled with appropriate brake oil or similar fluid to extend the life of the brake wear surfaces and to dissipate heat generated from braking operations to the housings 12, 14 and hub 20 for radiation to the ambient.

In operation, with the springs 68 urging the pressure plate 38 against the piston housing 14, the friction rotors 30 and separator plates 34 are separated by the built-in clearance and the wheel attached to the rotor 20 is free to rotate with respect to the axle affixed to the axle plate 16. When braking operation is desired, the pressure source 58 is actuated to pass brake oil or other appropriate fluid under pressure through the conduit 60 and into the annular groove 56. This pressure is communicated through the groove 56 and to each of the piston cavities 42. The pistons 44 respond to the pressure of the brake fluid and are urged against the pressure plate 38 to cause the pressure plate 38 to move the respective discs 30, 34 into frictional braking contacting engagement with each other. Upon completion of the braking operation, the pressure from the source 38 may be released such that the springs 68 urge the pressure plate 38 to release the frictional interengagement of the discs 30, 34 and similarly urge the pistons 44 back into their respective cavities 42. All of this operation is achieved in a closed and sealed brake assembly in which the frictional braking elements 30, 34 and the pressure plate 38 are sealed in an oil bath and isolated from the environment. Similarly, these elements are sealed from the brake fluid of the cavities 42.

When the brake assembly 10 requires service as by replacement of the friction rotors 30 or separator plates 34, for example, ready access to the wear parts of the assembly 10 may be achieved as a result of the unique structure of the torque pins 28. Removal of the nuts 40 of the torque pins 28 allows for removal of the brake housing 12 for such access. The utilization of the torque pins 28 as torque transmitting devices as well as clamping devices when used in conjunction with the nuts 40 provides for this feature.

Figure 2:
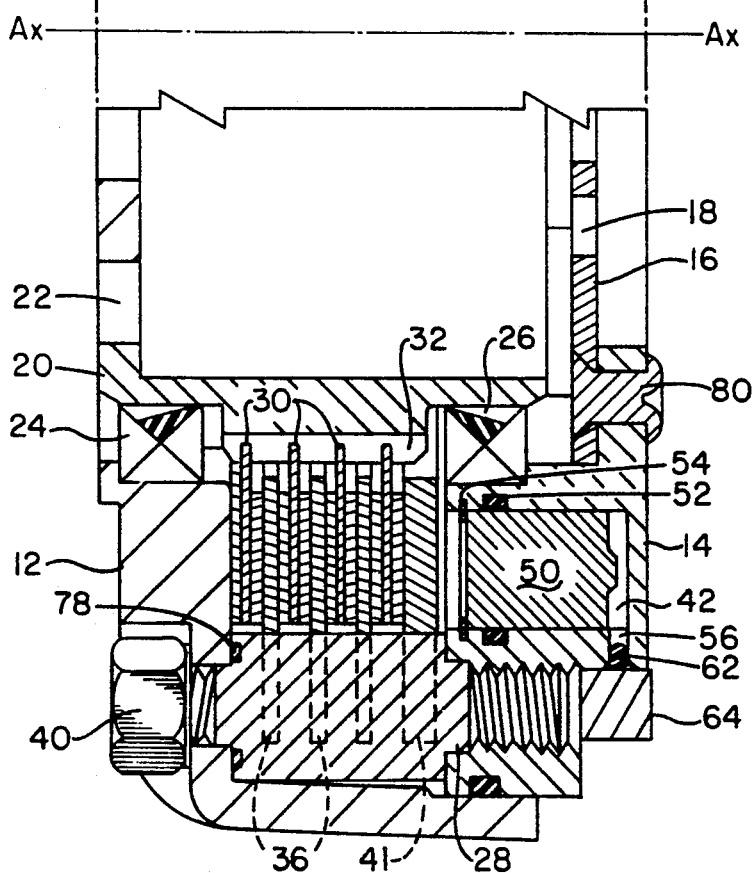
FIG. 2 is a partial sectional view of the portion of the wet brake disc assembly of FIG. 1 showing the "O" ring sealing member of the invention engaged between a retaining ring and the piston housing.

An important feature of the instant invention is the provision of the "O" ring seal 62 in the annular groove 56. Unlike traditional "O" ring seals, the force against the "O" ring 62 is, in this instance, radially received, rather than axially. As shown in FIG. 2, the annular groove 56 is tapered or chamfered at its outside diameter where it interfaces with the circumference of the piston housing 14. This taper or chamfer 74 has a maximum separation across the groove 56 which is greater than the undistorted cross sectional diameter of the "O" ring 62. The minimum separation of the groove 56 is, however, less than the cross sectional diameter of the undistorted "O" ring 62. With the "O" ring 62 being made of an appropriate elastomeric material, it may be urged into the groove 62 as facilitated by the taper or chamfer 74 and be retained therein by the retaining ring 64. The depth of the taper or chamfer 74 is preferably about equal to the cross sectional radius of the undistorted "O" ring 62. Accordingly, when the "O" ring 62 is inserted into the groove 56, as facilitated by the taper 74, the portion of the "O" ring 62 which extends beyond the terminal point of the taper 74 is distorted between the walls of the piston housing 14 defining the groove 56. This distortion of the elastomeric material assures sealing engagement between the "O" ring 62 and the walls of the groove 56. Of course, the depth of the groove 56 is greater than the maximum cross sectional dimension of the distorted "O" ring 62 such that a portion of the groove 56 remains unobstructed by the "O" rings 62, providing a passage from the pressure source 58 to all of the cavities 42.

The retaining ring 64 holds the "O" ring in place against the force imparted by the brake oil under force of the brake pressure source 58. In the preferred embodiment of the invention, the major outside diameter of the "O" ring 62 is substantially equal to the outside diameter of the piston housing 14 at the point of the groove 56 so that no bucking or unnecessary distortion of the "O" ring 62 is experienced during assembly. Accordingly, the "O" ring 62 will continually seal against the diametrically opposed walls of the groove 56 about the entire circumference thereof, preventing leaks during operation.

While the groove 56, "O" ring 62, and retaining ring 64 have been illustrated as entering an outside circumferential surface of the annular piston housing 14, it will be understood that such features could as well be presented through an outside circumferential surface. In such event, the "O" ring would have a diameter slightly greater than the diameter of the inside circumferential surface and would be compressed into the groove by an appropriate internal compression ring.

Reference herein has been made to the sealing ring 62 as an "O" ring. While such presently comprises the preferred structure of that element, it has been found that sealing having other than circular cross sections may work as well. Indeed, sealing rings having square, rectangular, U-shaped, or various other cross sections may provide the desired sealing function.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. In a power transmission device having a housing with a plurality of piston bores therein for controlling engagement and disengagement of friction members, the improvement comprising:

an annular groove within said housing interconnecting said bores and communicating with a source of fluid pressure, said annular groove circumferentially intersecting with a circumferential surface of said housing and further comprising a ring seal received within said annular groove and compressively held therein by a retaining ring, said ring seal comprising an "O" ring and said annular groove tapering inwardly from said circumferential surface, said taper extending from a maximum width exceeding an undistorted cross sectional diameter of said "O" ring to a minimum width less than an undistorted cross sectional diameter of said "O" ring, said annular groove having un untapered portion of said minimum width inwardly of said taper.

2. The power transmission device according to claim 1, wherein said "O" ring is retained partially within said tapered and partially within said untapered portions of said annular groove.

3. The power transmission device according to claim 1, wherein said "O" ring is elastomeric and is cross sectionally distorted within said annular groove.

4. The power transmission device according to claim 3, wherein said tapered portion of said annular groove has a depth less than an undistorted diameter of said "O" ring.

5. The power transmission device according to claim 1, wherein said "O" ring seals against opposite sides of said annular groove in a direction orthogonal to a diameter of said "O" ring.

* * * * *